United States Patent [19]

Sadakata

[11] Patent Number: 4,991,871
[45] Date of Patent: Feb. 12, 1991

[54] COLLAPSIBLE STEERING COLUMN APPARATUS

[75] Inventor: Kiyoshi Sadakata, Gunma, Japan

[73] Assignee: Nippon Seiko Kabushiki Kaisha, Tokyo, Japan

[21] Appl. No.: 475,833

[22] Filed: Feb. 6, 1990

[30] Foreign Application Priority Data

Dec. 11, 1989 [JP] Japan .............................. 1-142034[U]

[51] Int. Cl.$^5$ .............................................. B62D 1/18
[52] U.S. Cl. ...................................... 280/777; 74/492
[58] Field of Search ........................... 280/777; 74/492

[56] References Cited

U.S. PATENT DOCUMENTS

| | | | |
|---|---|---|---|
| 3,392,599 | 7/1968 | White | 280/777 |
| 3,470,761 | 10/1969 | Okamoto et al. | 280/777 |
| 4,445,708 | 5/1984 | Oakes et al. | 280/777 |
| 4,674,354 | 6/1987 | Brand | 280/777 |

FOREIGN PATENT DOCUMENTS 63-76578 5/1988 Japan .
63-255171 10/1988 Japan .

Primary Examiner—Kenneth R. Rice
Attorney, Agent, or Firm—Shapiro and Shapiro

[57] ABSTRACT

A collapsible steering column apparatus comprises a steering shaft in which a steering wheel is fixed to one end and a whole length in the axial direction can be contracted and a steering column in which a whole length in the axial direction can be contracted by inserting the edge portion of an inner column to the inside of the edge portion of an outer column. A first engaging portion is formed near the edge portion of the outer column. The first engaging portion comprises a pair of first arc portions which face each other and are respectively come into contact with the outer peripheral surface of the edge portion of the inner column and a pair of second arc portions which are arranged between the pair of first arc portions and are away from the outer peripheral surface of the edge portion of the inner column by having a radius of curvature which is smaller than a radius of curvature of the outer peripheral surface of the edge portion of the inner column. A second engaging portion is formed in the portion which is slightly near the center of the outer column than the first engaging portion. The second engaging portion comprises a pair of third arc portions which face each other and are respectively come into contact with the outer peripheral surface of the edge portion of the inner column and a pair of fourth arc portions which are arranged between the pair of third arc portions and are away from the outer peripheral surface of the edge portion of the inner column by having a radius of curvature which is smaller than the radius of curvature of the outer peripheral surface of the edge portion of the inner column. A length of the pair of third arc portions is set to be longer than a length of the pair of first arc portions.

7 Claims, 5 Drawing Sheets

COLLAPSIBLE STEERING COLUMN APPARATUS

BACKGROUND OF THE INVENTION

1. Field of the Invention

The present invention relates to a collapsible steering column apparatus in which a cylindrical steering column which is supported to the lower surface or the like of a dashboard of an automobile and into which a steering shaft constructing a steering apparatus for use in the automobile is inserted is set to a structure which can be contracted by a shock upon collision, thereby protecting the life of a passenger upon collision.

2. Related Background Art

Upon collision of an automobile, after what is called a primary collision in which the automobile collides with another automobile or the like, what is called a secondary collision in which a driver collides with a steering wheel occurs.

Upon such a secondary collision, in order to suppress the shock which the driver receives and to protect the life of the driver, there has been known a collapsible steering apparatus in which a steering shaft to fix a steering wheel at one end is set to what is called a collapsible steering shaft in which the whole length is contracted when a strong shock was applied, and a steering column into which the steering shaft is inserted is set to a collapsible type.

As such a collapsible steering column apparatus, hitherto, there has been known an apparatus disclosed in, for instance, JP-U-63-76578. As a structure to contract the whole length of the steering column in the axial direction upon shock absorption, there has been known a structure disclosed in, for instance, JP-A-63-255171.

Such a conventional well-known collapsible steering column apparatus is constructed as shown in FIGS. 1 to 3.

In FIG. 1, reference numeral 1 denotes a steering shaft in which a steering wheel 2 is fixed to an upper end portion and which is rotated in a twisting direction by the operation of the steering wheel 2. As shown in FIGS. 2 and 3, when a shock in the axial direction was applied, the whole length of the steering shaft 1 is contracted by mutually fitting a non-circular column portion 4 formed in the upper end portion of an inner shaft 3 into a non-circular cylinder portion 6 formed in the lower end portion of an outer shaft 5.

Reference numeral 7 denotes a cylindrical steering column into which the steering shaft 1 is inserted. Upper and lower end portions of the steering column 7 are supported to a part of a vehicle body 8 such as a lower surface of a dashboard by an upper supporting bracket 9 and a lower supporting bracket 10, respectively.

Attaching plate portions 19 to attach the upper supporting bracket 9 to the vehicle body 8 are formed on both sides of the upper supporting bracket 9 which is formed by bending a metal plate and is fixed to the upper end portion of the steering column 7 by welding or the like. Each attaching plate portion 19 is supported to the vehicle body 8 by a structure (since it is not concerned with the spirit of the present invention, it is not shown and its detailed description is omitted) such that when a strong shock was applied, each attaching plate portion is removed while absorbing the shock.

On the other hand, when a shock had been applied and the supporting of the upper supporting bracket 9 was released, the whole length of the steering column 7 is contracted by fitting the upper end portion of an inner column 11 and the lower end portion of an outer column 12 like a telescope.

As disclosed in JP-A-63-255171, the telescope-like engaging portion of the upper end portion of the inner column 11 and the lower end portion of the outer column 12 is constructed as shown in FIGS. 2 and 3 and as disclosed in JP-A-63-255171.

That is, a first engaging portion 13 is formed near the lower edge portion of the outer column 12 and a second engaging portion 14 is formed at a position which is slightly near the center than the first engaging portion 13. By pressing the upper end portion of the inner column 11 into both of the first and second engaging portion 13 and 14, the upper end portion of the inner column 11 is held to the lower end portion of the outer column 12 without a play. When a strong shock had been applied to the steering wheel 2 due to a collision accident and the upper supporting bracket 9 was removed from the vehicle body 8 and the whole length of the steering shaft 1 was contracted, both of the first and second engaging portions 13 and 14 slide along the outer peripheral surface of the inner column 11, thereby contracting the whole length of the steering column 7.

The first and second engaging portions 13 and 14 are constructed by: a pair of first arc portions 15 which are respectively come into contact with the outer peripheral surface of the upper end portion of the inner column 11; and a pair of second arc portions 16 which are arranged between the pair of first arc portions 15 and are away from the outer peripheral surface of the upper end portion of the inner column 11 by having a radius of curvature $r_1$ which is smaller than a radius of curvature R of the outer peripheral surface of the upper end portion of the inner column 11.

The second engaging portion 14 is formed in the same shape as the first engaging portion 13 and is constructed by: a pair of third arc portions 17 which face each other and are come into contact with the outer peripheral surface of the upper end portion of the inner column 11; and a pair of fourth arc portions 18 (refer to FIG. 7 showing an embodiment of the invention) which are arranged between the pair of third arc portions 17 and are away from the outer peripheral surface of the upper end portion of the inner column 11 by having a radius of curvature $r_2$ (in the conventional case, $r_1 = r_2$) which is smaller than the radius of curvature R of the outer peripheral surface of the upper end portion of the inner column 11.

By interposing both of the first and second engaging portions 13 and 14 in the coupling portion of the inner column 11 and outer column 12, the play in the coupling portion can be suppressed and the relative displacement between the inner column 11 and the outer column 12 can be smoothly executed. When the whole length of the steering column 7 is contracted upon collision, there is prevented the occurrence of hooking such as to cause an increase in impulsive force to the body of the driver who collided the steering wheel 2 in association with the secondary collision.

However, in the case of conventional collapsible steering column apparatus which is constructed and functions as mentioned above, the following subjects to be solved occur on the basis of the deformation of the inner column 11 in the assembling work of the steering column 7.

That is, in the case of constructing the steering column 7 by combining the inner column 11 and the outer column 12, as shown in FIG. 4, the upper end portion of the inner column 11 is inserted from the lower end opening of the outer column 12 in which both of the first and second engaging portions 13 and 14 have previously been formed.

An outer diameter H of the upper end portion of the inner column 11 before insertion, namely, in the free state is also larger than an interval D between the first arc portions 15 in the free state (H>D). Therefore, due to the inserting work, the upper end portion of the inner column 11 is pushed and crashed as shown in FIG. 4 and the shape of the cross section (cross sectional shape shown in FIG. 4) when it is cut at a plane connecting the centers of the first arc portions 15 (or the centers of the third arc portions 17) is inevitably tapered so as to become thin toward the tip.

On the other hand, in the case of the conventional collapsible steering column apparatus disclosed in JP-A-63-255171, the shapes and sizes in the free state of both of the first and second engaging portions 13 and 14 which are formed in the lower end portions of the outer column 12 are formed so as to have the same shapes and sizes. Therefore, as compared with the engaging strength of the first engaging portion 13 and the upper end portion of the inner column 11, the engaging strength of the second engaging portion 14 and the upper end portion of the inner column 11 inevitably becomes weak.

As mentioned above, when the engaging strength of the second engaging portion 14 and the upper end portion of the inner column 11 is weak, an abnormal sound is generated in the coupling portion of the inner column 11 and the outer column 12 due to the vibration which is caused upon running on a road in bad conditions or the like. Further, the steering wheel 2 (FIG. 1) vibrates and an unpleasant feeling is given to the driver. Thus, such a structure is unpreferable.

In the actual case, such an abnormal sound and a vibration of the steering wheel 2 are merely slightly caused in an extremely limited state such as a case where the vehicle runs on a bad road at a high speed and do not practically cause any problem in the present situation. However, in recent years, there is a tendency such that the weight of the portion of the steering wheel 2 increases by providing an air bag and various control switches to the positions over the steering wheel 2, and the like. There is a tendency such that the abnormal sound and the vibration of the steering wheel 2 also increase. Therefore, it is necessary to take an effective countermeasure.

To merely prevent the generation of the abnormal sound and the vibration as mentioned above, it is sufficient to increase thicknesses of metal pipes constructing the inner column 11 and outer column 12, to enlarge an outer diameter of the inner column 11, or to reduce an inner diameter of the outer column 12. However, if the engaging strength of the coupling portion of the upper end portion of the inner column 11 and the lower end portion of the outer column 12 was increased by such a method, it becomes difficult to contract the whole length of the steering column 7 upon collision and the impulsive force which is applied to the body of the driver upon secondary collision increases. Thus, such a method cannot be used.

SUMMARY OF THE INVENTION

It is an object of the present invention to provide a collapsible steering column apparatus in which a driver can be certainly protected upon collision and no unpleasant feeling is given to passengers when running on a bad road.

In a manner similar to the case of the foregoing conventional apparatus, a collapsible steering column apparatus of the invention is constructed by: a steering shaft in which a steering wheel is fixed to one end and a whole width in the axial direction can be contracted; and a steering column in which a whole length in the axial direction can be contracted by inserting an end portion of an inner column to the inside of an end portion of an outer column.

A first engaging portion comprising a pair of first arc portions and a pair of second arc portions is formed near the edge portion of the outer column. The pair of first arc portions face each other and are come into contact with the outer peripheral surface of the edge portion of the inner column. The pair of second arc portions are arranged between the pair of first arc portions and are away from the outer peripheral surface of the edge portion of the inner column by having a radius of curvature which is smaller than a radius of curvature of the outer peripheral surface of the edge portion of the inner column. On the other hand, a second engaging portion comprising a pair of third arc portions and a pair of fourth arc portions is formed in the portion which is slightly near the center of the outer column than the first engaging portion. The pair of third arc portions face each other and are come into contact with the outer peripheral surface of the end portion of the inner column. The pair of fourth arc portions are arranged between the pair of third arc portions and are away from the outer peripheral surface of the end portion of the inner column by having a radius of curvature which is smaller than the radius of curvature of the outer peripheral surface of the end portion of the inner column.

Further, in the collapsible steering column apparatus of the invention, a length of the pair of third arc portions is set to be longer than a length of the pair of first arc portions.

On the other hand, in the collapsible steering column apparatus of the invention, in place of a structure in which the length of the pair of third arc portions is set to be longer than the length of the pair of first arc portions, or in addition to such a structure that the length of the pair of third arc portion is set to be longer than the length of the pair of first arc portions, the distance between the pair of third arc portions is set to be narrower than the distance between the first arc portions.

The collapsible steering column apparatus of the present invention which is constructed as mentioned above is similar to the foregoing conventional collapsible steering column apparatus with respect to the operations themselves such that upon collision accident, the inner peripheral surfaces of both of the first and second engaging portions are slid along the outer peripheral surface of the inner column by an impulsive energy in association with the secondary collision and the whole length of the steering column is contracted.

However, according to the collapsible steering column apparatus of the invention, the length of the pair of third arc portions is set to be longer than the length of the pair of first arc portions (in the case of the invention disclosed in claim 1) or in place of setting the length of the pair of first arc portions to be longer than the length of the pair of third arc portions or by setting the length of the pair of first arc portions to be longer than the length of the pair of third arc portions and by setting the distance between the pair of third arc portions to be narrower than the distance between the first arc portions, if it is assumed that the outer diameters of the inner columns are equal, the engaging strength in the second engaging portion is larger than the engaging strength in the first engaging portion.

In the actual case, as mentioned above, when the edge portion of the inner column is inserted from the opening of the edge portion of the outer column to the inside of the outer column, the edge portion of the inner column is tapered so as to become thin toward the tip. Thus, the engaging strength in the second engaging portion is almost equal to the engaging strength in the first engaging portion.

Thus, the engaging strengths in both of the first and second engaging portions can be restricted to necessary sufficient magnitudes. It is possible to prevent the generation of the vibration and abnormal sound in the coupling portion of the edge portions of the inner and outer columns without increasing the force which is required to contract the whole length of the steering column.

BRIEF DESCRIPTION OF THE DRAWINGS

FIG. 1 is a schematic side elevational view showing a whole construction;

FIG. 2 is an enlarged cross sectional view of an A portion in FIG. 1;

FIG. 3 is a cross sectional view taken along the line B—B in FIG. 2;

FIG. 5 is a cross sectional view of a lower edge portion of an outer column;

FIG. 6 is a cross sectional view taken along the line C—C in FIG. 5;

FIG. 7 is a cross sectional view taken along the line D—D in FIG. 5;

FIG. 8 is a cross sectional view of a lower edge portion of the outer column;

FIG. 9 is a cross sectional view taken along the line E—E in FIG. 8; and

FIG. 10 is a cross sectional view taken along the line F—F in FIG. 8.

DESCRIPTION OF THE PREFERRED EMBODIMENTS

An embodiment of the present invention will be described hereinbelow with reference to the drawings.

Figure 5:
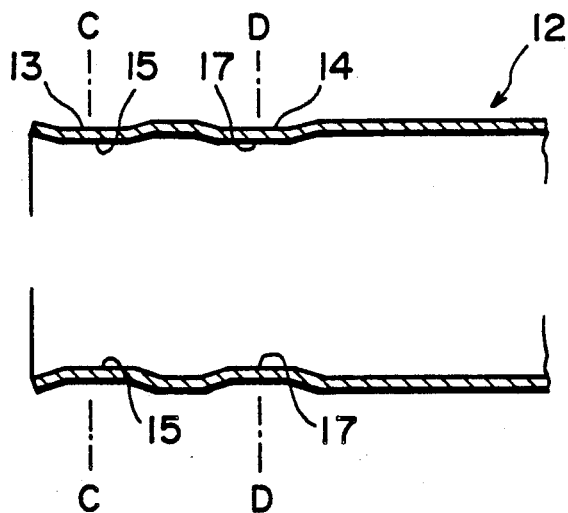
FIGS. 5 to 7 show the first embodiment of the present invention.
Figure 6:
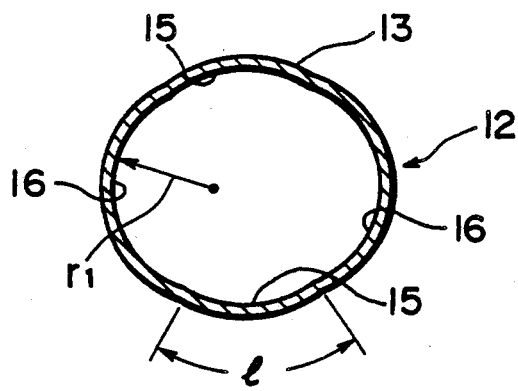
Figure 7:
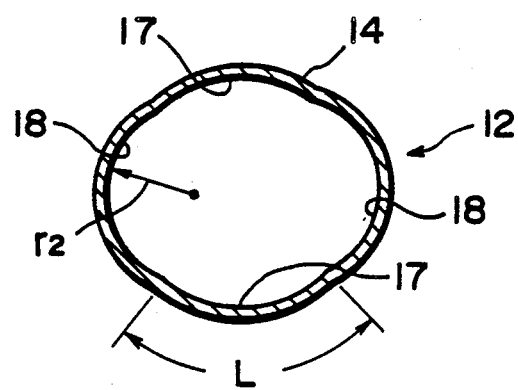

FIGS. 5 to 7 show the first embodiment of the invention. FIG. 5 is a cross sectional view of a lower end portion of an outer column. FIG. 6 is a cross sectional view taken along the line C—C in FIG. 5. FIG. 7 is a cross sectional view taken along the line D—D in FIG. 5.

Figure 1:
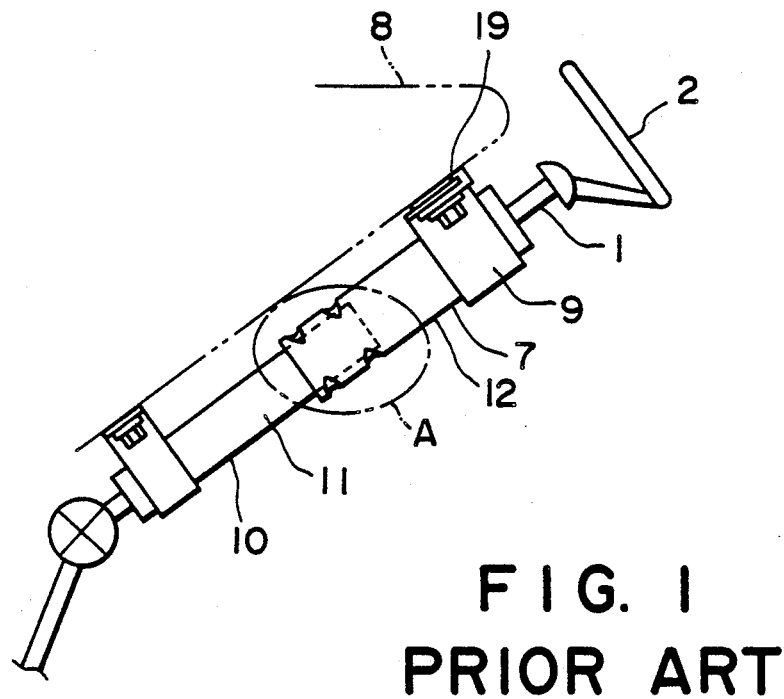
FIGS. 1 to 3 show a collapsible steering column apparatus in a conventional technique.
Figure 2:
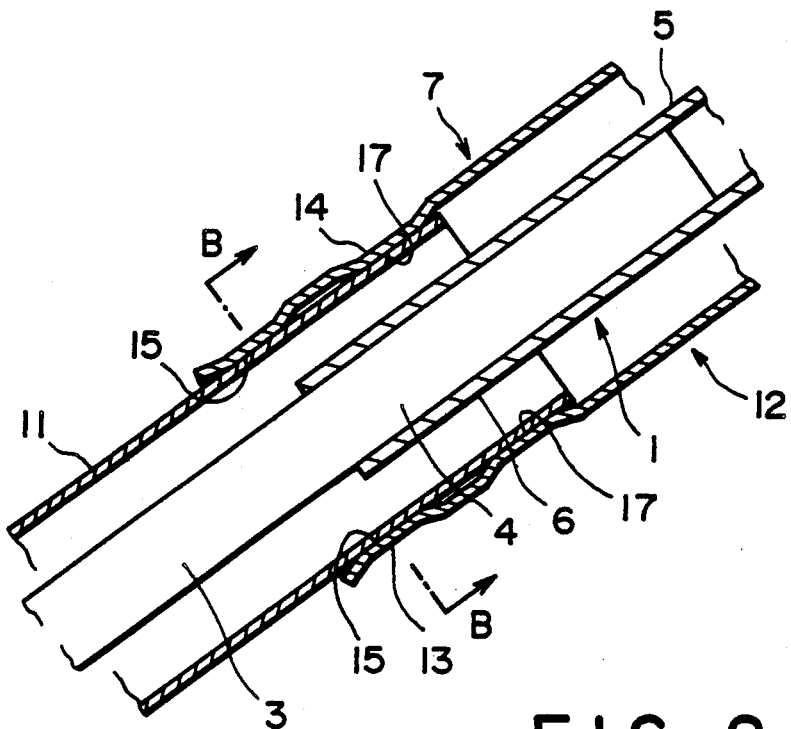
Figure 3:
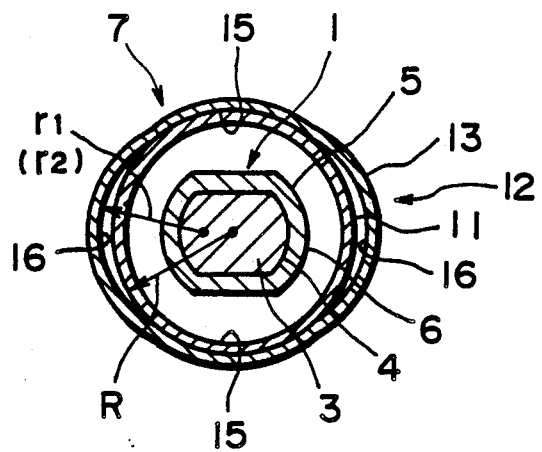

In a manner similar to the foregoing conventional collapsible steering column apparatus, as shown in FIGS. 1 to 3, a collapsible steering column apparatus of the embodiment comprises the steering shaft 1 and the steering column 7. The steering wheel 2 is fixed to one end of the steering shaft 1. The steering shaft 1 can freely transmit a force in the twisting rotating direction by the engagement between the non-circular column portion 4 formed in the upper end portion of the inner shaft 3 and the non-circular cylinder portion 6 formed in the lower end portion of the outer shaft 5 and the whole length in the axial direction of the steering shaft 1 can be contracted. The whole length in the axial direction of the steering column 7 can be contracted by inserting the upper end portion of the inner column 11 to the inside of the lower end portion of the outer column 12.

The first engaging portion 13 is formed near the lower edge portion of the outer column 12 and the second engaging portion 14 is formed in the portion which is slightly near the center than the first engaging portion 13, respectively. By pushing and inserting the upper end portion of the inner column 11 into both of the first and second engaging portions 13 and 14, the upper end portion of the inner column 11 is held to the lower end portion of the outer column 12 without any play.

The first engaging portion 13 in both of the first and second engaging portions 13 and 14 is constructed by: the pair of first arc portions 15 which are come into contact with the outer peripheral surface of the upper end portion of the inner column 11; and the pair of second arc portions 16 which are arranged between the pair of first arc portions 15 and are away from the outer peripheral surface of the upper end portion of the inner column 11 by having the radius of curvature $r_1$ which is smaller than the radius of curvature R (FIG. 3) of the outer peripheral surface of the upper end portion of the inner column 11.

The second engaging portion 14 is constructed by: the pair of third arc portions 17 which face each other and are come into contact with the outer peripheral surface of the upper end portion of the inner column 11; and the pair of fourth arc portions 18 which are arranged between the pair of third arc portions 17 and are away from the outer peripheral surface of the upper end portion of the inner column 11 by having the radius of curvature $r_2$ ($r_2 < R$) which is smaller than the radius of curvature R of the outer peripheral surface of the upper end portion of the inner column 11.

Further, in the collapsible steering column apparatus of the embodiment, a length L (FIG. 7) of the pair of third arc portions 17 constructing the second engaging portion 14 is set to be longer than a length l (FIG. 6) of the pair of first arc portions 15 constructing the first engaging portion is (L>l).

The collapsible steering column apparatus of the embodiment which is constructed as mentioned above is similar to the foregoing conventional collapsible steering column apparatus with respect to the operations themselves such that the inner peripheral surfaces of the first and third arc portions 15 and 17 constructing both of the first and second engaging portions 13 and 14 are slided along the outer peripheral surface of the inner column 11 by the impulsive energy in association with the secondary collision upon collision accident and the whole length of the steering column 7 is contracted.

However, according to the collapsible steering column apparatus of the embodiment, the length L of the pair of third arc portions 17 constructing the second engaging portion 14 is set to be longer than the length l of the pair of first arc portions 15 constructing the first engaging portion 13. Therefore, if it is assumed that the outer diameters R of the inner columns 11 are equal, the engaging strength in the second engaging portion 14 is larger than the engaging strength in the first engaging portion 13.

Figure 4:
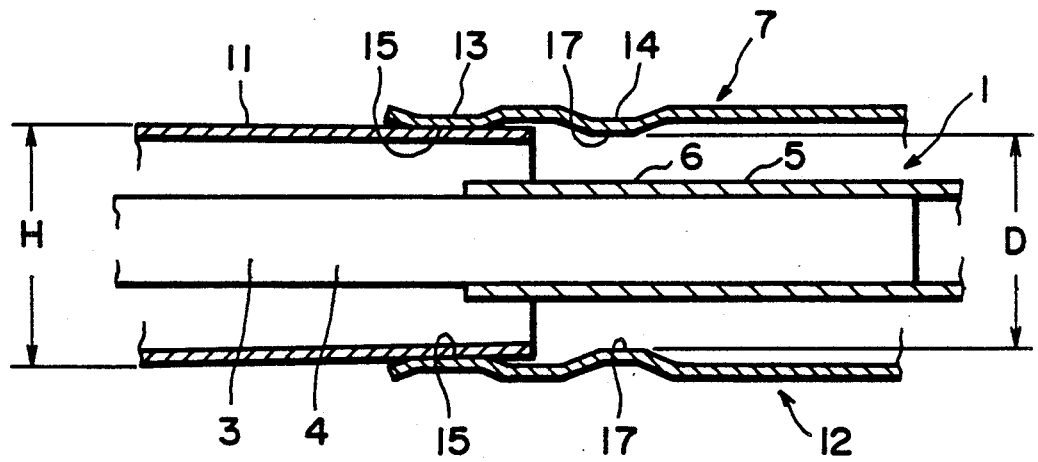
FIG. 4 is a cross sectional view showing a deforming state of an inner column in the assembling work of a steering column.

On the other hand, in the case of actually assembling the steering column 7, as shown in FIG. 4 mentioned above, when the upper end portion of the inner column 11 is inserted from the opening of the lower end portion of the outer column 12 to the inside of the outer column 12, the upper end portion of the inner column 11 is tapered so as to become thin toward the tip. Therefore, the engaging strength in the second engaging portion 14 existing near the tip of the inner column 11 decreases by only the amount of such a tapered shape, so that the engaging strength in the second engaging portion 14 is almost equalized to the engaging strength in the first engaging portion 13.

Thus, the engaging strengths in both of the first and second engaging portions 13 and 14 can be restricted to the necessary sufficient magnitudes. The generation of the vibration and abnormal sound in the coupling portion of the upper end portion of the inner column 11 and the lower end portion of the outer column 12 can be prevented without increasing the force which is required to contract the whole length of the steering column 7.

Figure 8:
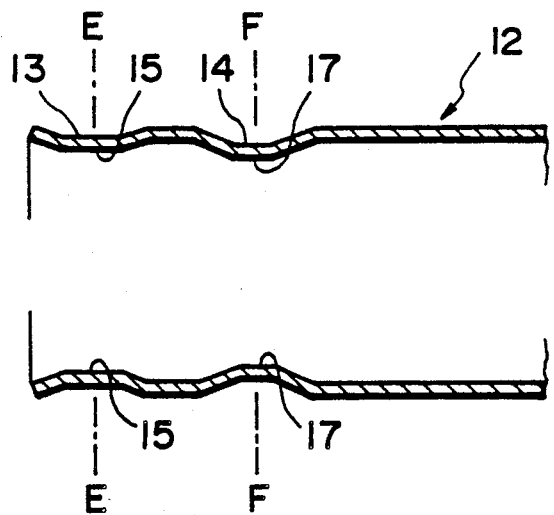
FIGS. 8 to 10 show the second embodiment of the invention.
Figure 9:
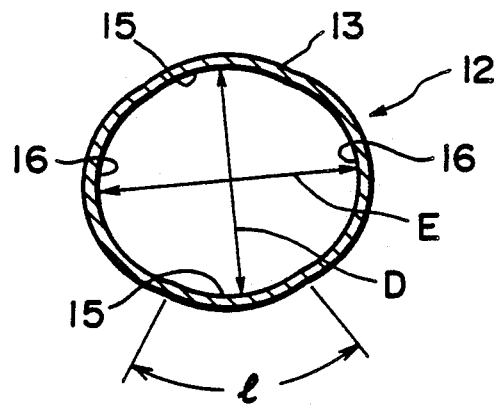
Figure 10:
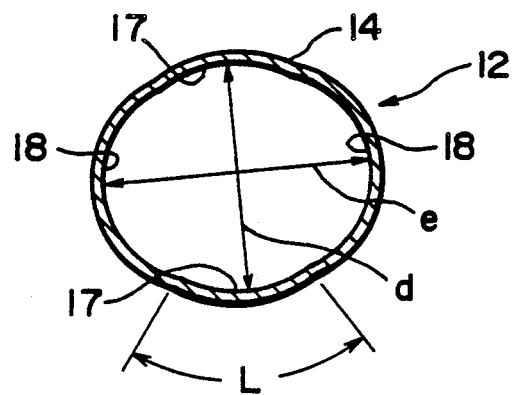

FIGS. 8 to 10 show the second embodiment of the invention. FIG. 8 is a cross sectional view of a lower end portion of an outer column. FIG. 9 is a cross sectional view taken along the line E—E in FIG. 8. FIG. 10 is a cross sectional view taken along the line F—F in FIG. 8.

In the case of the second embodiment, in place of setting the length L of the pair of third arc portions 17 constructing the second engaging portion 14 to be longer than the length l of the pair of first arc portions 15 constructing the first engaging portion 13, an distance d between the pair of third arc portions 17 is set to be narrower than the distance D between the first arc portions 15 (d<D).

Although the length L of the pair of third arc portions 17 is almost equalized to the length l of the pair of first arc portions 15 (L≈l), since the distance d between the pair of third arc portions 17 is set to be narrower than the distance D between the first arc portions 15 while setting the length L of the pair of third arc portions 17 to be almost equal to the length l of the pair of first arc portions 15, in the embodiment, by reducing a radius of curvature of the fourth arc portions 18 sandwiched by the third arc portions 17, an distance e between the fourth arc portions 18 can be set to be larger than an distance E between the second arc portions 16 sandwiched by the first arc portions 15 (e >E).

In the case of the collapsible steering column apparatus of the second embodiment which is constructed as mentioned above, the distance d between the pair of third arc portions 17 constructing the second engaging portion 14 is set to be narrower than the distance D between the pair of first arc portions 15 constructing the first engaging portion 13. Thus, if it is assumed that the outer diameter R (FIG. 3) of the inner columns 11 are equal, the engaging strength in the second engaging portion 14 is larger than the engaging strength in the first engaging portion 13.

On the other hand, in the case of actually assembling the steering column 7, as shown in FIG. 4 mentioned above, when the upper end portion of the inner column 11 is inserted from the opening of the lower end portion of the outer column 12 to the inside of the outer column 12, the upper end portion of the inner column 11 is tapered so as to become thin toward the tip. Therefore, the engaging strength in the second engaging portion 14 existing near the tip of the inner column 11 decreases by only the amount of such a tapered tip. Thus, the engaging strength in the second engaging portion 14 is almost equalized to the engaging strength in the first engaging portion 13.

Thus, the engaging strengths in both of the first and second engaging portions 13 and 14 can be restricted to the necessary sufficient magnitudes. The generation of the vibration and abnormal sound in the coupling portion of the upper end portion of the inner column 11 and the lower end portion of the outer column 12 can be prevented without increasing the force which is required to contract the whole length of the steering column 7.

Further, though, in FIG. 3, the wall thickness of the outer column 12 is substantially equal to that of the inner column 11, it is preferable that the wall thickness of the outer column 12 is equal to or more than that of the inner column 11. Because, recently the steering wheel is often provided with a collision impact absorber such as an air bag, so that the weight of the steering wheel may increase so as to become disadvantageous in respect to vibration and the like.

The first embodiment shown in FIGS. 5 to 7 and the second embodiment shown in FIGS. 8 to 10 can be individually embodied or can be also embodied in a combination thereof. That is, the length L of the pair of third arc portions 17 constructing the second engaging portion 14 is set to be longer than the length l of the pair of first arc portions 15 constructing the first engaging portion 13 and the distance d between the pair of third arc portions 17 can be also set to be narrower than the distance D between the first arc portions 15.

The collapsible steering column apparatus of the invention is constructed and functions as mentioned above, and the generation of the vibration and abnormal sound in the coupling portion of the edge portion of the inner column and the edge portion of the outer column can be prevented without increasing the force which is required to contract the whole length of the steering column. Therefore, it is possible to provide a collapsible steering column apparatus which can certainly protect the driver upon collision and does not give any unpeasant feeling to the passengers even in the running on a bad road.

A method for manufacturing a steering column of a collapsible steering column apparatus according to the invention of the present application is now described, by way of example, with reference to the following description and the accompanying drawings.

Figure 11:
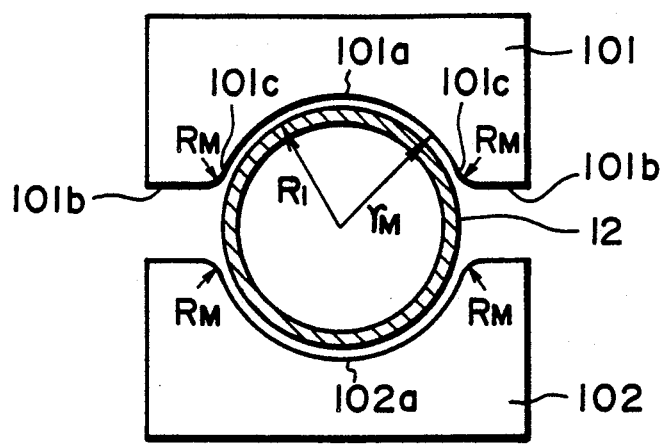
FIG. 11 is a front view showing an embodiment of pressing molds 101 and 102 for forming a first or a third arc portion in an outer column 12 of a collapsible steering column apparatus according to the present invention.

FIG. 11 is a front view of the pressing molds 101 and 102 for forming the first or the third arc portions around the outer column 12 of any of the above-mentioned embodiments. As each of the pressing molds 101 and 102 has a symmetric section, only the pressing mold 101 is described in detail.

In the pressing mold 101, the bottom surface is composed of a recess 101a which is a part of a cylinder substantially corresponding to the outer peripheral shape of the column 12 and flat planes 101b. The radius of curvature $r_M$ of the inner circumference of the recess 101a is slightly larger than the radius of curvature $R_1$ of the outer periphery of the column 12. Each boundary 101c between the recess 101a and each flat plane 101b is constituted with several smooth arc portions having a radius of curvature $R_M$. The arc portion may be single.

The effect of the pressing molds 101 and 102 will now be described. When the column 12 is formed with the pressing molds 101 and 102, the bottom of the recess 101a is first engaged with the column 12 so as to deform it, since the radius of curvature $r_M$ of the inner circumference of the recess 101a is slightly larger than the radius of curvature $R_1$ of the periphery of the column 12. Then, since slipping does not occur between the inner circumference of the recess 101a (102a) of the pressing mold 101 (102) and the periphery of the column 12, it is possible to deform the column 12 without causing gall streaks around the peripheral surface of the column 12.

Since the boundary 101c between the recess 101a and each flat plane 101b is constituted with smooth arc portions having the radius of curvature $R_M$, it is possible to deform the column 12 without causing defects or impressions around the peripheral surface of the column 12, when the column 12 is to be deformed.

In addition, the column 12 formed by the pressing molds 101 and 102, has radius curvatures of the inner peripheries of the first arc portions and the third arc portions which are respectively larger than that of the outer periphery of the inner column 11, which periphery abuts the both arc portions, and the column 12 has arc portions connected smoothly between the first and second arc portions and between the third and fourth arc portions, respectively. Therefore, when the inner column 11 is pressed into the outer column 12 or a collision of a vehicle is caused, an increment of contraction loads in the portions connected between the first arc portion and the second arc portion and between the third arc portion and the fourth arc portion caused by a gall between the columns 11 and 12, can be prevented.

Figure 12A:
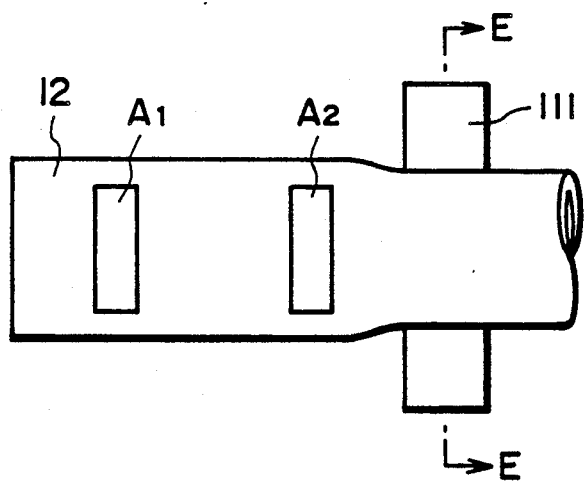
FIG. 12A is a top plan showing an outer column 12 which is deformed after stoppers 111 according to an embodiment of the invention has been attached thereto.

Next, a stopper 111 will be described with reference to FIG. 12A. FIG. 12A is a top plan of the outer column 12 which has been deformed after the stoppers 111 had been attached thereto.

The outer column 12 extending horizontally is pressed by the pressing molds (not shown) at regions $A_1$ and $A_2$ so as to form the first and third arc portions, respectively, when observing axially.

By pressing the outer column 12 with the pressing molds, deformations are brought about at wide portions around the regions $A_1$ and $A_2$ for considerable areas of the outer column 12 to be flattened. When the outer column 12 is thus flattened, easy assembling of the column 12 is abstracted. Therefore, in this embodiment a pair of stoppers 111 are disposed in opposition to each other in the direction perpendicular to the pressing direction of the pressing molds on both sides of the outer column 12. FIG. 12B is a cross sectional view of the stoppers 111 taken along the line EE of FIG. 12A. As shown in FIG. 12B, the surface of each stopper 111, which is engaged with the upper column 12, is plane. The distance between both stoppers 111 is set to be substantially equal to the outer diameter of the outer column 12 before deformation thereof so as to effectively prevent the upper column 12 from being deformed by pressing of the pressing molds.

Figure 12C:
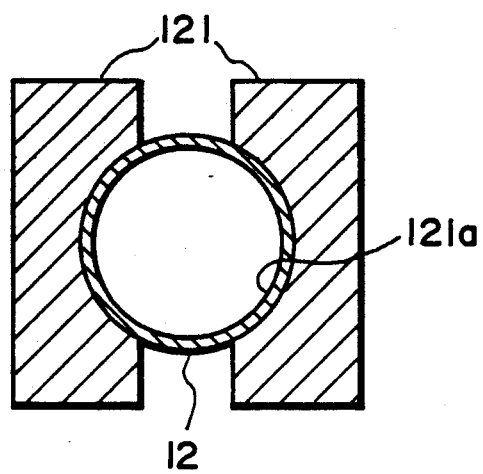
FIG. 12C is a cross sectional view showing a modification of the stoppers.
Figure 12B:
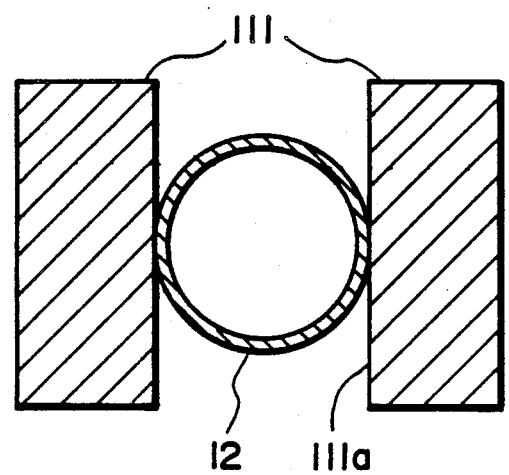
FIG. 12B is a cross sectional view taken along the line E—E of FIG. 12A.

FIG. 12C is a cross sectional view of stoppers according to a modification of the invention of the present application. The stopper 111a shown in FIG. 12C is different from that of FIG. 12B in that the surface 121a of the stopper 111a, which is engaged with the outer column 12, is cylindrical in correspondence to the periphery of the outer column 12. The cylindrical surface 121a can prevent the outer column 12 from moving in the vertical direction when the column 12 is worked upon.

The above-mentioned pressing molds and stoppers can be used for manufacturing not only the outer columns according to the embodiments of the specification but also the conventional outer columns.

I claim:

1. A collapsible steering column apparatus comprising:
   a steering shaft in which a steering wheel is fixed to one end and a whole length in an axial direction can be contracted; and
   a steering column in which a whole length in an axial direction can be contracted by inserting an edge portion of an inner column to the inside of an edge portion of an outer column,
   wherein a first engaging portion is formed near the edge portion of the outer column, the first engaging portion comprises a pair of first arc portions which face each other and are respectively come into contact with an outer peripheral surface of the edge portion of the inner column and a pair of second arc portions which are arranged between the pair of first arc portions and are away from the outer peripheral surface of the edge portion of the inner column by having a radius of curvature which is smaller than a radius of curvature of the outer peripheral surface of the edge portion of the inner column, a second engaging portion is formed in a portion which is slightly near the center of the outer column than the first engaging portion, the second engaging portion comprises a pair of third arc portions which face each other and are respectively come into contact with the outer peripheral surface of the edge portion of the inner column and a pair of fourth arc portions which are arranged between the pair of third arc portions and are away from the outer peripheral surface of the edge portion of the inner column by having a radius of curvature which is smaller than the radius of curvature of the outer peripheral surface of the edge portion of the inner column, and a length of the pair of third arc portions is set to be longer than a length of the pair of first arc portions.

2. An apparatus according to claim 1, wherein in place of setting the length of the pair of third arc portions to be longer than the length of the pair of first arc portions, an distance between the pair of third arc portions is set to be narrower than an distance between the first arc portions.

3. An apparatus according to claim 1, wherein the length of the pair of third arc portions is set to be longer than the length of the pair of first arc portions and an distance between the pair of third arc portions is set to be narrower than an distance between the first arc portions.

4. A collapsible steering column apparatus comprising:
  a steering shaft in which a steering wheel is fixed to one end and a whole length in an axial direction can be contracted; and
  a steering column in which a whole length in an axial direction can be contracted by inserting an edge portion of an inner column to the inside of an edge portion of an outer column,
  wherein a first engaging portion is formed near the edge portion of the outer column, the first engaging portion comprises a pair of first arc portions which face each other and are respectively come into contact with an outer peripheral surface of the edge portion of the inner column and a pair of second arc portions which are arranged between the pair of first arc portions and are away from the outer peripheral surface of the edge portion of the inner column by having a radius of curvature which is smaller than a radius of curvature of the outer peripheral surface of the edge portion of the inner column, a second engaging portion is formed in a portion which is slightly near the center of the outer column than the first engaging portion, the second engaging portion comprises a pair of third arc portions which face each other and are respectively come into contact with the outer peripheral surface of the edge portion of the inner column and a pair of fourth arc portions which are arranged between the pair of third arc portions and are away from the outer peripheral surface of the edge portion of the inner column by having a radius of curvature which is smaller than the radius of curvature of the outer peripheral surface of the edge portion of the inner column, and the radius of curvature of the inner surface of each of the first and third arc portions is larger than the radius of curvature of the periphery of the inner column which periphery abuts the both arc portions.

5. A collapsible steering column apparatus comprising:
  a steering shaft in which a steering wheel is fixed to one end and a whole length in an axial direction can be contracted; and
  a steering column in which a whole length in an axial direction can be contracted by inserting an edge portion of an inner column to the inside of an edge portion of an outer column,
  wherein a first engaging portion is formed near the edge portion of the outer column, the first engaging portion comprises a pair of first arc portions which face each other and are respectively come into contact with an outer peripheral surface of the edge portion of the inner column and a pair of second arc portions which are arranged between the pair of first arc portions and are away from the outer peripheral surface of the edge portion of the inner column, a second engaging portion is formed in a portion which is slightly near the center of the outer column than the first engaging portion, the second engaging portion comprises a pair of third arc portions which face each other and are respectively come into contact with the outer peripheral surface of the edge portion of the inner column and a pair of fourth arc portions which are arranged between the pair of third arc portions and are away from the outer peripheral surface of the edge portion of the inner column by having a radius of curvature which is smaller than the radius of curvature of the outer peripheral surface of the edge portion of the inner column, and at least one of a portion connected between the first and the second arc portions and a portion connected the third and fourth arc portions, comprises one or more smooth curves.

6. A collapsible steering column apparatus comprising:
  a steering shaft in which a steering wheel is fixed to one end and a whole length in an axial direction can be contracted; and
  a steering column in which a whole length in an axial direction can be contracted by inserting an edge portion of an inner column to the inside of an edge portion of an outer column,
  wherein a first engaging portion is formed near the edge portion of the outer column, the first engaging portion comprises a pair of first arc portions which face each other and are respectively come into contact with an outer peripheral surface of the edge portion of the inner column and a pair of second arc portions which are arranged between the pair of first arc portions and are away from the outer peripheral surface of the edge portion of the inner column by having a radius of curvature which is smaller than a radius of curvature of the outer peripheral surface of the edge portion of the inner column, a second engaging portion is formed in a portion which is slightly near the center of the outer column than the first engaging portion, the second engaging portion comprises a pair of third arc portions which face each other and are respectively come into contact with the outer peripheral surface of the edge portion of the inner column and a pair of fourth arc portions which are arranged between the pair of third arc portions and are away from the outer peripheral surface of the edge portion of the inner column by having a radius of curvature which is smaller than the radius of curvature of the outer peripheral surface of the edge portion of the inner column, and deformations of portions except for the first, second, third and fourth arc portions of the outer column, are prevented.

7. A collapsible steering column apparatus comprising:
  a steering shaft in which a steering wheel is fixed to one end and a whole length in an axial direction can be contracted; and
  a steering column in which a whole length in an axial direction can be contracted by inserting an edge portion of an inner column to the inside of an edge portion of an outer column,
  wherein a first engaging portion is formed near the edge portion of the outer column, the first engaging portion comprises a pair of first arc portions which face each other and are respectively come into contact with an outer peripheral surface of the edge portion of the inner column and a pair of second arc portions which are arranged between the pair of first arc portions and are away from the outer peripheral surface of the edge portion of the inner column by having a radius of curvature which is smaller than a radius of curvature of the outer peripheral surface of the edge portion of the inner column, a second engaging portion is formed in a portion which is slightly near the center of the outer column that the first engaging portion, the second engaging portion comprises a pair of third arc portions which face each other and are respectively come into contact with the outer peripheral surface of the edge portion of the inner column and a pair of fourth arc portions which are arranged between the pair of third arc portions and are away from the outer peripheral surface of the edge portion of the inner column by having a radius of curvature which is smaller than the radius of curvature of the outer peripheral surface of the edge portion of the inner column, and the wall thickness of the outer column is thicker than that of the inner column.

* * * * *